(12) United States Patent
Schachtely et al.

(10) Patent No.: US 7,923,504 B2
(45) Date of Patent: Apr. 12, 2011

(54) THERMOPLASTIC COMPOUND/MATRIX

(75) Inventors: Uwe Schachtely, Kahl am Main (DE); Jürgen Meyer, Stockstadt/Main (DE); Thomas Schiener, Alzenau (DE); Frank Menzel, Hanau (DE)

(73) Assignee: Evonik Degussa GmbH, Essen (DE)

( * ) Notice: Subject to any disclaimer, the term of this patent is extended or adjusted under 35 U.S.C. 154(b) by 10 days.

(21) Appl. No.: 11/917,517

(22) PCT Filed: May 29, 2006

(86) PCT No.: PCT/EP2006/062675
§ 371 (c)(1), (2), (4) Date: May 28, 2009

(87) PCT Pub. No.: WO2007/000382
PCT Pub. Date: Jan. 4, 2007

(65) Prior Publication Data
US 2010/0029818 A1 Feb. 4, 2010

(30) Foreign Application Priority Data
Jun. 25, 2005 (EP) .................... 05013757

(51) Int. Cl.
*C08K 3/36* (2006.01)
(52) U.S. Cl. .................................. 524/493
(58) Field of Classification Search .......... 524/493
See application file for complete search history.

(56) References Cited

U.S. PATENT DOCUMENTS 5,959,005 A 9/1999 Hartmann et al.

FOREIGN PATENT DOCUMENTS

| | | |
|---|---|---|
| DE | 1163784 | 2/1964 |
| DE | 24 03 783 A1 | 8/1975 |
| DE | 10239423 | 3/2004 |
| EP | 0 466 958 A | 1/1992 |
| JP | 2-122227 | 5/1990 |
| JP | 8-335604 | 12/1996 |
| JP | 11-343465 | 12/1999 |
| JP | 2001-68604 | 3/2001 |
| JP | 2004-317560 | 11/2004 |
| WO | WO 98/52240 | * 11/1998 |
| WO | WO 2004/020532 | 3/2004 |
| WO | WO 2005/054390 | 6/2005 |
| WO | WO 2005/095525 | 10/2005 |

OTHER PUBLICATIONS

Japanese Office Action for Application No. 2008-517453 mailed Sep. 17, 2010 in English language.

* cited by examiner

*Primary Examiner* — Ling-Siu Choi
*Assistant Examiner* — Sonya Wright
(74) *Attorney, Agent, or Firm* — Smith, Gambrell & Russell, LLP

(57) ABSTRACT

Thermoplastic matrix/compound, comprising thermoplastic polymer and silanised, structurally modified, pyrogenically produced silica.

6 Claims, No Drawings

THERMOPLASTIC COMPOUND/MATRIX

INTRODUCTION AND BACKGROUND

The invention relates to thermoplastic a matrix/compound having improved mechanical properties.

A thermoplastic is a plastic that softens when heated and hardens again when cooled. Thermoplastics can generally go through many melt/freeze cycles with no appreciable chemical change, making them suitable for recycling. These characteristics also lend thermoplastics to various manufacturing techniques, injection molding, thermoforming and welding.

Many thermoplastic materials are addition polymers (chain growth polymers), such as polyethene and polypropylene.

Thermoplastic polymers are contrasted with thermosetting polymers, which cannot go through melt/freeze cycles.

The mechanical and thermomechanical properties of a material are essential parameters for the design of manufactures articles.

In order to give a material the best possible properties, it is often sought to modify it using suitable chosen additives or fillers.

This technique is used in particular for the production of thermoplastic compounds.

The possibility of improving the impact strength of thermoplastic polymers by incorporating mineral inclusions, of a chosen size and concentration, in a matrix is also known.

It is known to use glass fibres to increase the modulus of a thermoplastic. Glass fibres are large-sized objects, which considerably weaken the materials. In addition, they must be used in high concentrations, of the order of 40%. For example, polyamides containing glass fibres have a high modulus but a low elongation at break. In addition, the materials obtained have a low fatigue strength.

To improve the modulus of thermoplastics, fillers of a much smaller size than fibres have been proposed. Patent FR 1 134 479 describes compositions based on nylon-6 containing silica particles having a particle size of 17 to 200 nm. More recently, materials have been described which contain plate-like mineral particles, for example exfoliated montmorillonites (U.S. Pat. No. 4,739,007) or synthetic fluoromicas. These materials have an increased modulus but a reduced impact strength.

SUMMARY OF THE INVENTION

For a given thermoplastic, it is found that there is a compromise between the impact strength and the modulus, one of these generally being improved to the detriment of the other. Compositions reinforced by high glass fibre contents improve the compromise, but there is a reduction in the elongation at break and fatigue behaviour.

The subject of the present invention is a thermoplastic for which the compromise between toughness and modulus is greatly improved, for relatively low additive contents, and/or for which the elongation at break properties and fatigue behaviour are maintained.

The subject of the invention is a thermoplastic matrix/compound, comprising 40 to 99.9 wt.-% thermoplastic polymer, 0.1 to 60 wt.-% silianised, structurally modified, pyrogenically produced silica.

The silanised, structurally modified, pyrogenically produced silica is disclosed in DE 10239423A1 and US 2005/244642, the disclosure of which is relied on and incorporated herein by reference.

Accordingly the silanised, structurally modified, pyrogenically produced silica can be silanised, structurally modified, pyrogenically produced silicas, which are characterised by groups fixed on the surface, the groups being dimethylsilyl and/or monomethylsilyl, preferably dimethylsilyl.

DETAILED DESCRIPTION OF INVENTION

In a preferred embodiment of the silicas can have the following physico-chemical characteristics:

| | |
|---|---|
| BET surface area $m^2/g$: | 25-400 |
| Average size of the primary particles nm: | 5-50 |
| pH value: | 3-10 |
| Carbon content %: | 0.1-10 |
| DBP value %: | <200 |

The silica can have a tamped density of 100 to 280, preferably 100 to 240 g/l.

Pyrogenic silicas are known from Winnacker-Küchler Chemische Technologie, volume 3 (1983) 4th edition, page 77 and Ullmanns Enzyklopädie der technischen Chemie, $4^{th}$ edition (1982), volume 21, page 462.

In particular, pyrogenic silicas are produced by flame hydrolysis of vaporisable silicon compounds, such as e.g. $SiCl_4$, or organic silicon compounds, such as trichloromethylsilane.

The process for the production of the silanised, structurally modified, pyrogenically produced silicas can be characterised in that pyrogenically produced silica is treated with dimethyldichlorosilane and/or monomethyltrichlorosilane by a known method, the dimethylsilyl and/or monomethylsilyl groups being fixed on the surface of the pyrogenic silica, and is then structurally modified and optionally post-ground.

A tempering can take place after the structural modification and/or post-grinding.

The silicas can be produced e.g. as follows:

The silicas, which can be produced as described in DE 1 163 784 and GB 1031764 which is relied on and incorporated herein by reference, are then structurally modified by mechanical action and possibly post-ground in a mill. A tempering can possibly take place after the structural modification and/or post-grinding.

The structural modification can take place e.g. with a ball mill or a continuously operating ball mill. The post-grinding can take place e.g. using an air-jet mill or pin mill. The tempering can take place batchwise, e.g. in a drying cupboard, or continuously, e.g. in a fluidised bed. The tempering can take place under protective gas, e.g. nitrogen.

The silanised, structurally modified, pyrogenically produced silica can be incorporated into the thermoplastic by different ways.

First: The Silica can be mixed with the monomer, which is then polymerised. To this polymer other additives can be added to form the final matrix/compound.

Second: The silica and other additives can be added to the polymer to create a master batch. That master batch can be diluted with further polymer to create the final matrix/compound.

The final matrix/compound can be used to form the semi-finished products or final products.

The thermoplastic compound can contain additional additives, like
0 to 60 wt.-% fibres
0 to 60 wt.-% filler
0 to 50 wt.-% other additives The matrix can consist of a thermoplastic polymer or copolymer or a thermoplastic containing a thermoplastic polymer or copolymer. It may consist of a blend of polymers or copolymers, these possibly being compatibilized by modification, using grafting or using compatibilizers.

Thermoplastic can be chosen from the group comprising polyolefins, polyamides, polyurethanes, polyesters, polycarbonates, polyacetals, acrylic and methacrylic polymers, styrene polymers, vinyl polymers, polymer and copolymer blends based on these polymers, and polyvinyl chloride.

By way of example of suitable thermoplastics as the matrix, mention may be made of polylactones, such as poly (pivalolactone), poly(caprolactone) and polymers of the same family; polyurethanes obtained by the reaction between diisocyanates, such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphe-nyl diisocyanate, 4,4'-biphenylisopropylidene diisocyanate, 3,3'-dimethyl-4,4'-diphenyl diisocyanate, 3,3'-dimethyl-4,4'-diphenylmeth-ane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and compounds of the same family and linear long-chain diols, such as poly (tetramethylene adipate), poly(ethylene adipate), poly(1,4-butylene adipate), poly(ethylene succinate), poly(2,3-butylene succinate), polyether diols and compounds of the same family; polycarbonates, such as poly(methane bis[4-phenyl] carbonate), poly(bis[4-phenyl]-1,1-ether carbonate), poly (diphenylmethane bis[4-phenyl]carbonate), poly(1,1-cyclohexane-bis[4-phenyl]carbonate) and polymers of the same family; polysulphones; polyethers; polyketones; polyamides, such as poly(4-aminobutyric acid), poly(hexamethylene adipamide), poly(6-aminohexanoic acid), poly(m-xylylene adipamide), poly(p-xylylene sebacamide), poly(2,2,2-trimethylhexamethylene terephthalamide), poly(metaphenylene isophthalamide), poly(p-phenylene terephthalamide) and polymers of the same family; polyesters, such as poly(ethylene azelate), poly(ethylene-1,5-naphthalate, poly(1,4-cyclohexanedimethylene terephthalate), poly(ethylene oxybenzoate), poly(para-hydroxybenzoate), poly(1,4-cyclohexylidene dimethylene terephthalate), poly(1,4-cyclohexylidene dimethylene terephthalate), polyethylene terephthalate, polybutylene terephthalate and polymers of the same family; poly(arylene oxides), such as poly(2,6-dimethyl-1,4-phenylene oxide), poly(2,6-diphenyl-1,4-phenylene oxide) and polymers of the same family; poly(arylene sulphides), such as poly(phenylene sulphide) and polymers of the same family; polyetherimides; vinyl polymers and their copolymers, such as polyvinyl acetate, polyvinyl alcohol and polyvinyl chloride; polyvinylbutyral, polyvinylidene chloride, ethylene/vinyl acetate copolymers and polymers of the same family; acrylic polymers, polyacrylates and their copolymers, such as polyethyl acrylate, poly(n-butyl acrylate), polymethyl methacrylate, polyethyl methacrylate, poly (n-butyl methacrylate), poly(n-propyl methacrylate), polyacrylamide, polyacrylonitrile, poly(acrylic acid), ethylene/acrylic acid copolymers, ethylene/vinyl alcohol copolymers, acrylonitrile copolymers, methyl methacrylate/styrene copolymers, ethylene/ethyl acrylate copolymers, methacrylate-butadiene-styrene copolymers, ABS and polymers of the same family; polyolefins, such as low-density polyethylene, polypropylene, low-density chlorinated polyethylene, poly (4-methyl-1-pentene), polyethylene, polystyrene and polymers of the same family; ionomers; poly(epichlorohydrins); polyurethanes, such as products from the polymerization of diols, such as glycerol, trimethylolpropane, 1,2,6-hexanetriol, sorbitol, pentaerythritol, polyether polyols, polyester polyols and compounds of the same family, with polyisocyanates, such as 2,4-tolylene diisocyanate, 2,6-tolylene diisocyanate, 4,4'-diphenylmethane diisocyanate, 1,6-hexamethylene diisocyanate, 4,4'-dicyclohexylmethane diisocyanate and compounds of the same family; and polysulphones, such as the products resulting from the reaction between a sodium salt of 2,2-bis(4-hydroxyphenyl)propane and 4,4'-dichlorodiphenylsulphone; furan resins, such as polyfuran; cellulose-ester plastics, such as cellulose acetate, cellulose acetate-butyrate, cellulose propionate and polymers of the same family; silicones, such as poly(dimethylsiloxane), poly (dimethylsiloxane-co-pheny-lmethylsiloxane) and polymers of the same family; and blends of at least two of the above polymers.

Most particularly preferred among these thermoplastic polymers are polyolefins, such as polypropylene, polyurethanes, polyethylene, high-density polyethylene, low-density polyethylene, polyamides, such as nylon-6 and nylon-6,6, PVC, PET and blends and copolymers based on these polymers.

| | |
|---|---|
| ABS | acrylonitrile-butadiene-styrene |
| ASA | acrylonitrile-styrene-acrylate |
| CA | cellulose acetate |
| CAB | cellulose acetate butyrate |
| CP | cellulose propionate |
| | cyclic olefin copolymers |
| EP | ethylene-propylene |
| ETFE | ethylene-tetrafluoroethylene |
| EVAC | ethylene-vinyl acetate |
| EVOH | ethylene-vinyl alcohol |
| FEP | tetrafluoroethylene-hexafluoropropylene ionomer |
| LCP | liquid crystal polymers |
| MABS | methylmethacrylate-acrylonitrile-butadiene-tyrene |
| MBS | methacrylate-butadiene-styrene |
| PA | polyamide |
| PA 6 | polyamide 6 |
| PA 11 | polyamide 11 |
| PA 12 | polyamide 12 |
| PA 66 | polyamide 66 |
| PA 610 | polyamide 610 |
| PA 612 | polyamide 612 |
| | high temperature resistant polyamides |
| PPA | polyphtalamide |
| | transparent polyamide |
| PAEK | polyaryletherketones |
| PAI | polyamidimide |
| PB | polybutene |
| PBT | polybutylene terephthalate |
| PC | polycarbonate |
| PCTFE | polychlorotrifluoroethylene |
| PE | polyethylene |
| HDPE | high density polyethylene |
| HMW-HDPE | high melecular weight high density polyethylene |
| UHMW-HDPE | ultra high molecular weight high density polyethylene |
| LDPE | low density polyethylene |
| LLDPE | linear low density polyethylene |
| VLDPE | very low density polyethylene |
| MDPE | medium density polyethylene |
| PE-C | chlorinated polyethylene |
| PEI | polyetherimide |
| PES | polyethersulfone |
| PET | polyethylene terephthalate |
| PFA | perfluoro alkoxyl alkane |
| PIB | polyisobutylene |
| PMMA | polymethyl methacrylate |
| PMMI | poly-N-methyl-methacryimide |
| POM | polyoxymethylene |
| PP | polypropylene |

| | |
|---|---|
| PP-B | polypropylene impact copolymers |
| PP-H | polypropylene homopolymers |
| PP-R | polypropylene random copolymers |
| PPE | polyphenylene ether |
| PPS | polyphenylene sulfide |
| PPSU | polyphenylene sulfone |
| PS | polystyrene |
| EPS | expandable polystyrene |
| HIPS | high impact polystyrene |
| PSU | polysulfone |
| PTFE | polytetrafluoroethylene |
| PVAC | polyvinyl acetate |
| PVAL | polyvinyl alcohol |
| PVC | polyvinyl chloride |
| PVC-C | chlorinated polyvinyl chloride |
| PVDC | polyvinylidene chloride |
| PVDF | polyvinylidene fluoride |
| SAN | styrene-acrylonitrile |
| SB | styrene-butadiene |
| SMAH | styrene-maleic anhydride |
| | tetrafluoroethylene-hexafluoropropylene-vinylidene fluoride |
| VC | copolymers of vinyl chloride |
| | biodegradable plastics |

Thermoplastic elastomers like

| | |
|---|---|
| PEBA | polyether block amides |
| TEEE | thermoplastic elastomers, ether ester |
| TEO | thermoplastic elastomers, olefinic |
| EPDM/PP | ethylene propylene diene rubber-polypropylene elastomeric polymer alloys |
| | ethylene propylene diene rubber-based alloys |
| | acrylonitrile butadiene rubber-based alloys |
| | other elastomeric polymer alloys |
| TES | thermoplastic elastomers, styrenic |
| TPU | thermoplastic polyurethanes |
| TPV | thermoplastic vulcanizates |
| | thermoplastic resins |

The thermoplastic polymer can contain fibres to reinforce the plastic. This means that the following plastics or thermoplastics can be used:

| | |
|---|---|
| BFK | boron fiber reinforced plastics |
| CFK | carbon fiber reinforced plastics |
| GFK | glass fiber reinforced plastics |
| | glass fiber reinforced thermoplastics |
| GMT | glass mat reinforced thermoplastics |
| | glass fiber reinforced thermosets |
| | glass fiber reinforced unsaturated polyester molding compounds |
| MFK | metallic fiber reinforced plastics |
| SFK | synthetic fiber reinforced plastics |

The thermoplastic matrix or compound can contain the following fillers and reinforcements:
carbon
graphite
carbon black
spherical fillers
solid spherical fillers
solid glass spheres
other mineral solid spherical fillers
hollow spherical fillers
hollow glass spheres
other mineral hollow spherical fillers
conductive fillers
metal and metal oxides
metallic fibers
metal oxides
metallic flakes
mineral fillers
aluminium trihydroxide
barium sulfate
calcium carbonates
natural calcium carbonate
precipitated calcium carbonate
dolomite
silica
natural silica
quartz
synthetic silica
cristobalite
precipitated silica
pyrogenic silica
fused silica
silicates
natural silicates
feldspar
nepheline syenite
mica
kaolin
calcined kaolin
slate
talc
wollastonite
synthetic silicates
precipitated calcium silicate
precipitated sodium aluminium silicate
silicon carbide
synthetic fibers
aramid fibers
glass fibers
carbon fibers
mineral fibers
polyamide fibers
polyester fibers The thermoplastic matrix or compound can contain other additives like:
antifogging agents
antistatic agents
biocides
dispersants
compatibilizers
pigment dispersants
fragrances
air release agents
colorants
dyes
pigments
inorganic pigments
white pigments
carbon black
colored inorganic pigments
organic pigments
special colorants
flame retardants
inorganic flame retardants
organic flame retardants
halogen-free flame retardants
halogenated flame retardants
brominated flame retardants
chlorinated flame retardants
lubricants and related auxiliaries
lubricants antiblocking agents
antislip agents
slip agents
coupling agents
silanes
titanates
zirconates
initiators
organic peroxides
flatting agents
nucleating agents
nucleating agents for foams
optical brighteners
impact modifiers
stabilizers
antioxidants
light stabilizers
metal deactivators
PVC stabilizers
acid acceptors
chemical blowing agents
processing aids
processing aids (PVC)
processing aids (polyolefins)
antisetting agents
mold release agents
low profile additives
thixotropic agents
viscosity regulators
crosslinking agents
plasticizers The thermoplastic matrix/compound shows an improvement of the E-modulus.

EXAMPLE 1

A conventional twin screw extruder was used to incorporate and disperse a silanised, structurally modified, pyrogenically produced silica (fumed silica) according to DE 102 39 423 A1 into polypropylene as the thermoplastic polymer. A silica loading of 15% was used in this example to produce a master batch of the thermoplastic polymer and the fumed silica. The master batch was granulated after compounding for better handling.

For the investigation of the improvement in mechanical properties the master batch was mixed with polypropylene granulate to achieve specific silica loadings of 1%, 3% and 5%. For comparison polypropylene with no silica was used as well.

For tensile tests shoulder test bars where produced with a conventional injection moulding machine.

The test results regarding the improvement of the E modulus are as follows (table 1):

TABLE 1

Test Results of the E Modulus in MPa from Polypropylene
Test Results of the E Modulus in MPa from Polypropylene

| Silica Loading % | E Modulus MPa |
| --- | --- |
| 0 | 1523 |
| 1 | 1552 |
| 3 | 1608 |
| 5 | 1630 |

Polymer: Polypropylene (PP)
Tradename: Moplen EP540P

EXAMPLE 2

A planetary roller extruder from ENTEX was used to incorporate and disperse a silanised, structurally modified, pyrogenically produced silica (fumed silica) according to DE 102 39 423 A1 into various thermoplastic polymers as shown in the table 2 below:

TABLE 2

| Polymer Type | Polymer Name | Manufacturer |
| --- | --- | --- |
| PE-LD | Sabic LDPE 1808AN00 | Sabic |
| PE-HD | Hostalen GA 7260 | Basell Polyolefins |
| PC | Bayblend T45 | Bayer MaterialScience |
| PS | Repstyrol 61L | Unknown |
| ABS | Polylack PA 727 | Chi Mei Corporation |
| PMMA | Plexiglas 7H | Arkema/Atoglas |
| PVDF | Solef 1008 | Solvay |

A silica loading of 10% was used in this example to produce master batches of the thermoplastic polymers shown in table 2 and the fumed silica. Each master batch was granulated after compounding for better handling.

For the investigation of the improvement in mechanical properties each master batch was mixed with the corresponding polymer granulate to achieve specific silica loadings of 1%, 5% and 10%. For comparison each polymer with no silica was used as well.

For tensile tests shoulder test bars where produced with a conventional injection moulding machine.

The test results regarding the improvement of the E modulus are as follows (table 3):

TABLE 3

Test Results of the E Modulus in MPa from Different Thermoplastic Polymers: Silica Loading

| no silica | 1% | 5% | 10% |
| --- | --- | --- | --- |
| 182 | 182 | 206 | 228 |
| 1189 | 1230 | 1334 | 1430 |
| 2032 | 2052 | 2166 | 2368 |
| 3198 | 3216 | 3354 | 3490 |
| 2320 | 2314 | 2478 | 2704 |
| 3172 | 3400 | 3502 | 4026 |
| 2120 | 2160 | 2160 | 2400 |

| Polymer: | Tradename: |
| --- | --- |
| PE-LD | Sabic LDPE 1808AN00 natur |
| PE-HD | Hostalen GA 7260 natur |
| PC | Bayblend T45 natur |
| PS | Repstyrol 61L |
| ABS | Polylack PA 727 natur |
| PMMA | Plexiglas 7H |
| PVDF | Solef 1008 |

The invention claimed is:

1. Thermoplastic matrix/compound, comprising 40 to 99.9 wt.-% thermoplastic polymer and 0.1 to 60 wt.-% silanised, structurally modified, pyrogenically produced silica having dimethylsilyl and/or monomethylsilyl groups fixed to the silica surface, wherein the structural modification took place with a ball mill or a continuously operating ball mill.

2. The thermoplastic matrix/compound according to claim 1, wherein the silanised, structurally modified, pyrogenically produced silica is characterized by the following physico-chemical characteristics:

| | |
|---|---|
| BET surface area m$^2$/g: | 25-400 |
| Average size of the primary particles nm: | 5-50 |
| pH value: | 3-10 |
| Carbon content %: | 0.1-10 |
| DBP value %: | <200. |

3. The thermoplastic matrix/compound according to claim 1, wherein the silica is present in an amount of 0.1 to 10% by weight.

4. The thermoplastic matrix/compound according to claim 1, wherein the thermoplastic matrix/compound has an increased E Modulus compared to an identical thermoplastic/matrix containing no silica.

5. The thermoplastic matrix/compound according to claim 1, wherein the structural modification took place with the ball mill.

6. The thermoplastic matrix/compound according to claim 2, wherein the structural modification took place with the ball mill.

* * * * *